United States Patent [19]

McCann et al.

[11] Patent Number: 4,887,871
[45] Date of Patent: Dec. 19, 1989

[54] HYDRAULIC ANTI-LOCK BRAKING SYSTEMS FOR VEHICLES

[75] Inventors: Denis J. McCann, Powys, Wales; Stuart B. Dawson, West Midlands; Andrew J. Ward, Birmingham, both of England

[73] Assignee: Lucas Industries public limited company, Great Britain

[21] Appl. No.: 313,956

[22] Filed: Feb. 21, 1989

[30] Foreign Application Priority Data

Feb. 24, 1988 [GB] United Kingdom ............... 8804308

[51] Int. Cl.⁴ ............................................. B60T 8/42
[52] U.S. Cl. ................................................. 303/113
[58] Field of Search ............ 188/181 A; 303/92, 110, 303/113, 114, 115, 116, 119

[56] References Cited

U.S. PATENT DOCUMENTS

3,550,966  12/1970  Leiber ............................... 303/119
3,731,980   5/1973  Fink et al. ......................... 303/119

*Primary Examiner*—Duane A. Reger
*Attorney, Agent, or Firm*—Laff, Whitesel, Conte & Saret

[57] ABSTRACT

In an anti-lock braking system incorporating a solenoid-operated fluid flow control valve, the rate at which fluid can normally be dumped to release a brake is increased by the provision of a pilot valve. The pilot valve is adapted to open by a pressure drop across a diaphragm. The pressure drop is established when an exhaust valve opens upon energization of the solenoid in response to an anti-lock signal.

7 Claims, 3 Drawing Sheets

HYDRAULIC ANTI-LOCK BRAKING SYSTEMS FOR VEHICLES

This invention relates to hydraulic anti-lock braking systems for vehicles of the kind in which a supply of braking-applying fluid from a master cylinder to a brake is controlled in accordance with the behaviour of the wheel braked by the brake by a brake-pressure modulating means, and the behaviour of the braked wheel is sensed by anti-lock means which emit anti-lock skid signals, the modulating means incorporating a solenoid-operated control valve which is responsive to an anti-lock signal to cause the brake to be released by relieving hydraulic fluid to a reservoir, and fluid-pressure means being provided to cause the brake to be re-applied automatically following recovery of the wheel, re-application of the brake by the fluid-pressure means being initiated by the solenoid-operated control valve.

One known type of braking system of the kind set forth, for example as disclosed in EP-A No. 0 251 519, comprises a cut-off valve located between the master cylinder and the brake, the cut-off valve having an open condition in which brake-applying fluid pressure can be transmitted from the master cylinder to the brake, and a closed condition in which the brake is isolated from the hydraulic pressure in the master cylinder, an expander piston movable in a bore between an advanced position in which the cut-off valve is in its open condition and a retracted position in which the cut-off valve is in its closed condition, an expansion chamber of variable volume in fluid communication with the brake having a smaller volume when the expander piston is in its advanced position and a larger volume when the expander piston is in its retracted position, a support chamber defined in part by the part of the bore into which the piston retracts and being in fluid communication with the fluid-pressure means through a first fluid pathway, the hydraulic pressure in the support chamber determining the position of the expander piston, and a second fluid path way provided from the support chamber to the reservoir, the solenoid-operated control valve being so constructed and arranged that upon energisation of the solenoid in response to an anti-lock signal the support chamber is isolated from the fluid-pressure means, and communication between the support chamber and the reservoir is opened to dump the hydraulic fluid from the support chamber whereby the expander piston retracts, in turn to cause the cut-off valve to isolate the brake from the master cylinder and relieve the hydraulic pressure in the brake.

In another type of braking system of the kind set forth, the master cylinder is connected to the brake through a normally-open solenoid-operated cut-off valve which is also responsive to an anti-lock signal to isolate the master cylinder from the brake, and the solenoid-operated control valve is operable to relieve the pressure applied to the brakes to the reservoir, following closure of the cut-off valve.

In both these known braking systems, the rate at which fluid can be returned to the reservoir determines the rate at which the brake can be relieved in response to an anti-lock signal. This rate is determined by the size of an exhaust port controlled by a valve member in the solenoid-operated control valve, the valve member and the exhaust port co-operating to define an exhaust valve.

The size of this exhaust port and the capacity of the solenoid are chosen to cater for the volumes of fluid encountered in braking systems of the kind used generally in cars or light vans.

Larger volumes of hydraulic fluid are present in braking systems for trucks, say up to 10 TONS, and in order to cater for such larger volumes the capacity of the solenoid-operated fluid flow control valve would have to be increased substantially, with corresponding modifications to other components of the system.

According to our invention, in an hydraulic anti-lock braking system of the kind set forth for vehicles, the solenoid-operated flow control valve incorporates a normally-closed exhaust valve for controlling the release of hydraulic fluid to the reservoir, the exhaust valve comprising an exhaust port, and a valve member controlling flow through the port, and a pilot valve operable by a pressure-responsive member is adapted to provide communication to the reservoir through an exhaust passage of a size greater than that of the exhaust port, the pilot valve normally being biased into a closed position to close the exhaust passage but being movable into an open position in response to a pressure drop across the pressure-responsive member, said pressure drop being established by the exhaust valve opening upon energisation of the solenoid.

This enables us to increase the rate at which pressure can be released from the brake in response to an anti-lock signal, and enables the system to cater for the larger volumes of fluid which may be associated with the braking systems of larger vehicles, without modification to the solenoid-operated control valve itself.

The pilot valve preferably comprises a flexible diaphragm, a valve seating at the end of the exhaust passage remote from the reservoir, and into engagement with which the diaphragm is biased to close the exhaust passage when substantially equal pressures are applied to opposite sides of the diaphragm, a servo chamber on one side of the diaphragm being placed in communication with the reservoir to establish the pressure drop when the exhaust valve opens, restrictor means being provided for restricting the application of pressure to the side of the diaphragm opposite the servo chamber in comparison with relatively unrestricted re-application of pressure to the servo chamber upon closure of the exhaust valve, in turn to cause the pilot valve to close.

Biasing of the diaphragm may be constituted by the inherent strain energy in the material of the diaphragm, with the closure force being augmented by the pressure in the servo chamber.

The pilot valve may be remote from the solenoid-operated flow control valve.

Some embodiments of our invention are illustrated in the accompanying drawings in which.

Figure 1:
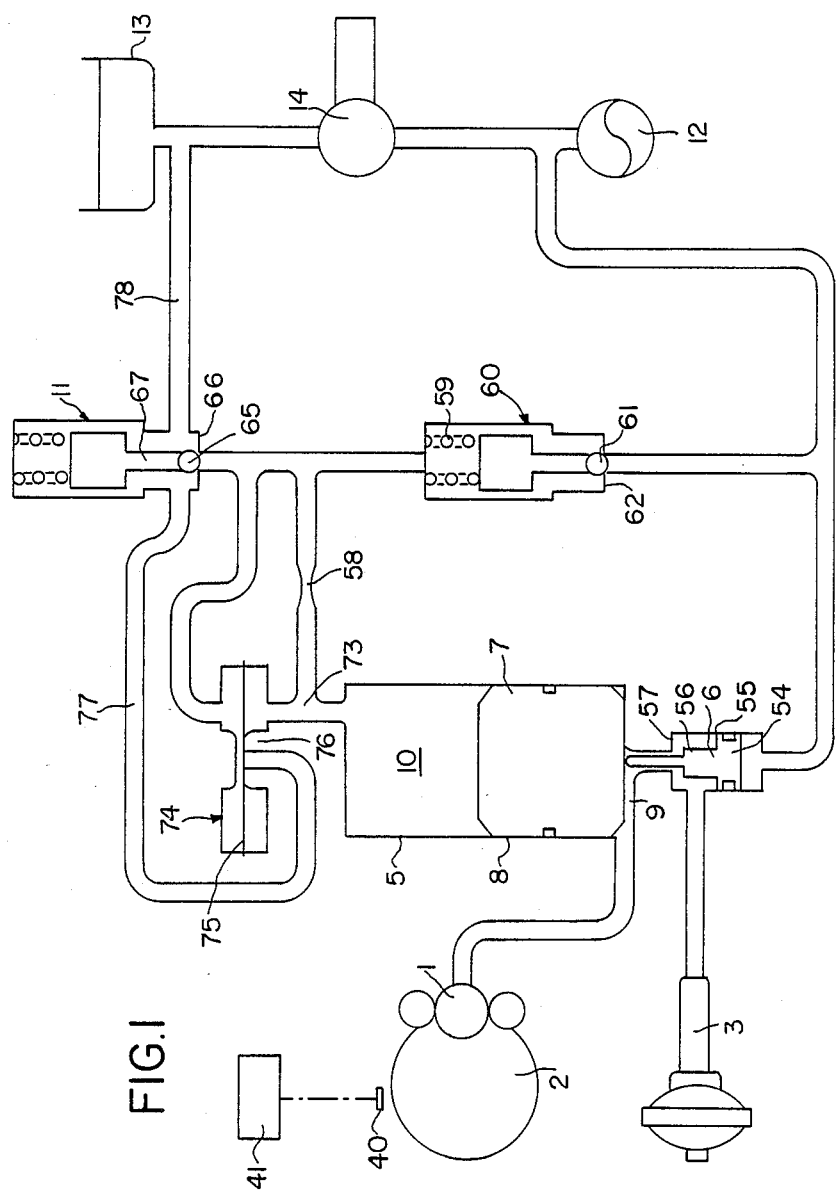
FIG. 1 is a layout of an hydraulic anti-lock braking system for a vehicle.

In the braking system illustrated in FIG. 1 of the drawings a brake 2 on a wheel 1 of a vehicle is adapted to be applied by a pedal-operated master cylinder 3, and the supply of fluid from the master cylinder 3 to the brake 1 is modulated in accordance with the behaviour of the wheel 2 by a modulator assembly.

The modulator assembly comprises a housing 5 incorporating a cut-off valve 6 which is operated by an expander piston 7 working in a bore 8. An expansion chamber 9 is defined in the bore 8 between the piston 7 and the valve 6, and the position of the piston 7 in the bore 8 is determined by the volume of fluid trapped in a support chamber 10 at the opposite end of the piston 7.

A solenoid-operated valve 11 controls the supply of fluid to the chamber 10 from an hydraulic accumulator 12 and the release of fluid from the chamber 10 to a reservoir 13. The accumulator 12 is charged by a pump 14 which draws fluid from the reservoir 13 and which is either driven by an electric motor, or from the prime mover of the vehicle.

The cut-off valve 6 comprises a piston 54 working in a bore 55. The piston 54 has a head 56 which is normally held away from a seating 57 by the expander piston 7 so that the master cylinder 3 is in open communication with the brake 2 through the expansion chamber 9.

A solenoid-operated inlet valve 60 controls communication between the accumulator 12 and the support chamber 10 through a restricted orifice 58. The valve 60 comprises a valve head 61 for engagement with a seating 62. The valve head 61 is carried by an armature 63 and is normally urged against the seating 62 by means of a spring 59.

The solenoid-operated valve 11 is in series with the valve 60 and constitutes an exhaust valve which controls the release of fluid to the reservoir 13. The valve 11 comprises a valve head 65 for engagement with a seating 66. The valve head 65 is carried by an armature 67 and is normally urged into engagement with the seating 66 by means of a spring.

A pipe-line 73 interconnects the support chamber 10 and the orifice 58 to a pilot valve 74 which, in turn, controls the rate at which fluid can be dumped from the support chamber 10 to the reservoir 13.

As illustrated the pilot valve 74 comprises an imperforate diaphragm 75 which is engageable with a seating 76 to close a first return passage 77, and the first passage 77 is in communication with a second return passage 78 connected to the reservoir 13, through the valve 11. The diaphragm 75 is subjected on opposite sides to pressure in the passage 73 on opposite sides of the orifice 58, and opposite sides of the diaphragm 75 are isolated from the reservoir 13 by the valve 11.

The speed of rotation of the wheel 1 is sensed by an electrical speed sensor 40, and signals from the sensor are fed into a control module 41 which, according to the nature of the signal, produces an electrical current to energise the coils of the two solenoid-operated valves 11 and 60 to actuate the two valves in a sequence and in a manner to be described.

In the inoperative position shown in the drawings both solenoid-operated valves 60 and 11 are closed, the expander piston 7 is held in an advanced position by the volume of fluid trapped in the support chamber 10 between the valves 11 and 60 which, in turn, holds the valve 60 open, the pilot valve 74 is closed with the diaphragm 75 urged against the seating 76 by the inherent strain energy in the diaphragm 75, and the pump 14 is inoperative.

When the master cylinder 3 is operated, fluid is applied to the brake 2 through the expander chamber 9. Similarly, when the master cylinder 3 is released, fluid is returned to it in the opposite direction.

When the control module recognises a skid signal, it acts to open the valve 11. This places both sides of the diaphragm 75 in communication with the reservoir 13. Due to the presence of the restricted orifice 58, the diaphragm 75 moves away from the seating 76 due to a relatively higher reduction in pressure on the side of the diaphragm remote from the seating 76. Opening the pilot valve 74 dumps fluid rapidly from the chamber 10 to the reservoir 13 through the passages 77 and 78. This enables the piston 7 to retract, initially to permit the cut-off valve 6 to close and, subsequently, to increase the effective volume of the chamber 9 to release the brake 2.

When the wheel 1 recovers, the control module is operative to close the valve 11, and open the valve 60.

Closing the valve 11 isolates the pilot valve 74 from the reservoir. Opening the valve 60 admits pressure fluid from the accumulator 12 to both sides of the diaphragm 75 but at different pressures determined by the pressure drop across the restricted orifice 58. This causes the pilot valve 74 to close. The pressure on the downstream side of the orifice 58 which acts on the side of the diaphragm adjacent to the seating 76 also acts on the expander piston 7 to cause it to advance in the bore 8 and re-apply the brake 1 by displacement of fluid from the chamber 9.

Should the pressure in the accumulator fail, the pressure in the master cylinder 3 acts on the piston 54 to move it relatively away from the expander piston 7. This therefore provides a 'fail-safe' feature by either establishing, or maintaining, communication between the master cylinder 3 and the brake 2.

Figure 2:
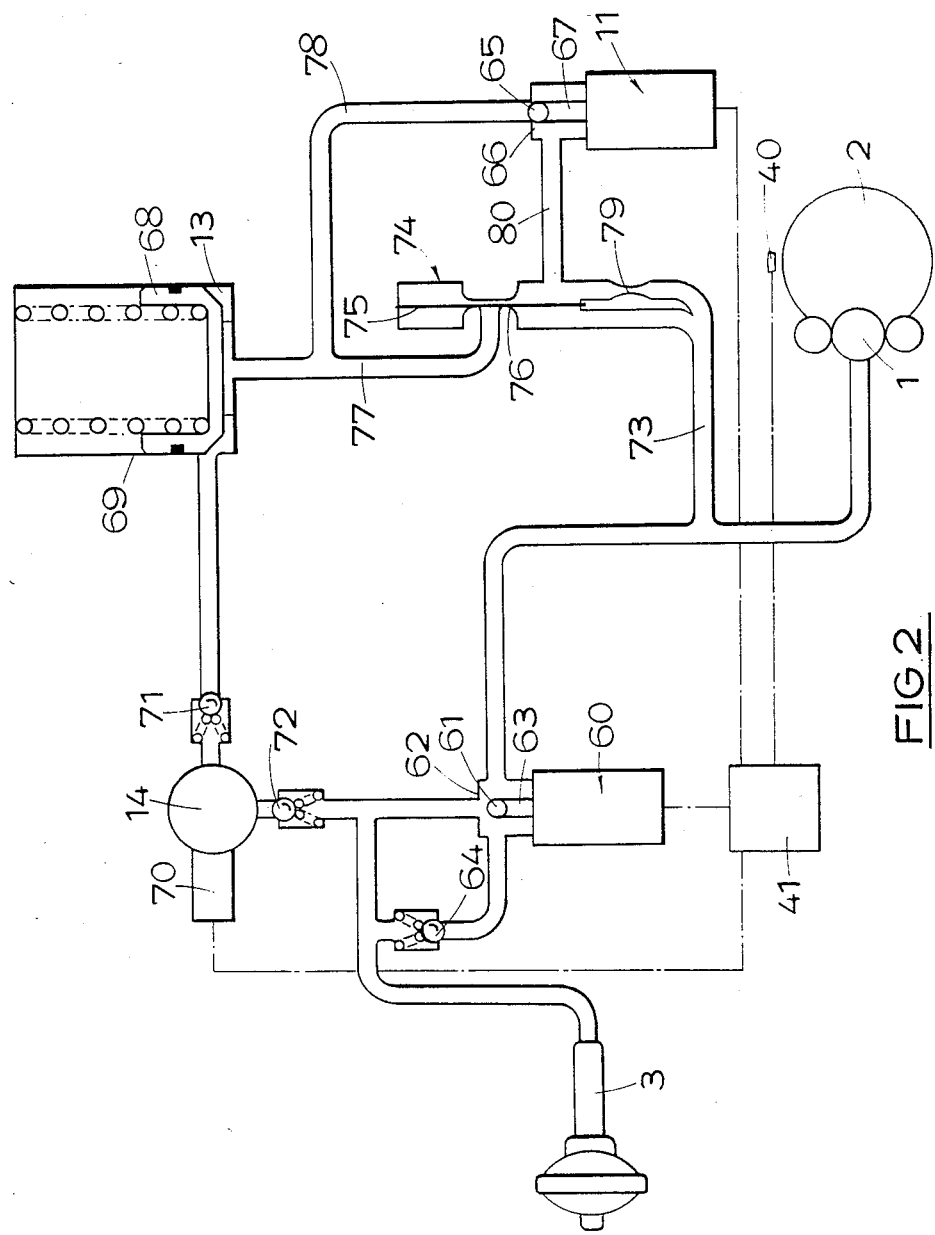
FIG. 2 is a layout of another hydraulic anti-lock braking system.

In the hydraulic anti-lock braking system illustrated in FIG. 2 of the drawings the master cylinder 3 is connected to the brake 1 through the solenoid-operated inlet valve 60 in which the valve head 61 is normally urged away from the seating by means of a spring (not shown). Fluid can be returned from the brake 1 to the master cylinder 3 through a one-way return valve 64 when the inlet valve 60 is closed.

The solenoid-operated valve 11 is normally closed to cut off communication with the reservoir 13.

The two solenoid-operated valves 60 and 11 and the pump 14 are all operated in sequence in response to signals from the control module 41.

The reservoir 13 comprises an expander chamber which is defined by a space between a spring-loaded piston 68 and a bore 69 in which the piston 68 works.

The pump 14 is driven by a electric motor 70 and is adapted to withdraw fluid from the reservoir 13 through a one-way inlet valve 71 and pump it back to the master cylinder 3 through a one-way outlet valve 72, at least when the solenoid-operated valve 60 is closed.

A pipe-line 73 leads from a connection between the solenoid-operated valve 60 and the brake 1 to the pilot valve 74 which controls the rate at which fluid can be relieved from the brake 1 to the reservoir 13.

As illustrated the imperforate diaphragm 75 engages the seating 76 to close the first return passage 77 to the reservoir 13, and the second return passage 78 is normally closed by the solenoid-operated valve 11. The diaphragm 75 is subjected on opposite sides to pressure in the passage 73. Unrestricted pressure is applied to the side of the diaphragm adjacent to the seating 76, and the pressure is applied to the opposite side leading to the solenoid-operated valve 11 through a restricted orifice 79 located upstream of a passage 80 leading to the valve 11.

In the normal inoperative position illustrated in FIG. 2 of the drawings, the valve 60 is open, the valve 11 is closed, the pilot valve 74 is closed with the diaphragm 75 urged against the seating 76 by the inherent strain energy of its material, and the pump 14 is inoperative. The brake 1 can be applied directly from the master cylinder 3, with fluid returned to the master cylinder upon release of the operating pedal.

When the master cylinder 3 is released, the pressure acting on both sides of the diaphragm 75 is reduced. The restricted orifice 79 acts to reduce the rate at which the pressure is reduced from that side of the diaphragm 75 in comparison with that acting on the opposite side of the diaphragm 75. This ensures that a pressure differential is maintained across the diaphragm to hold the valve 74 in a closed position with the diaphragm 75 in engagement with the seating 76. Thus accidental opening of the pilot valve on brake release is prevented.

Such accidental opening of the pilot valve 74 on brake release could allow fluid to be returned to the reservoir 13. Since the reservoir 13 would then accommodate at least some fluid, the effective volume of the reservoir would then be reduced. Thus the rate of which fluid could be dumped from the brake 1 during an anti-lock cycle, to be described later, would be reduced or when the pump 14 returns fluid to the brake 1 after recovery of the wheel 2, again to be described, there will be more fluid in the reservoir 13 than was intended. Under such circumstances, satisfactory brake re-application cannot be achieved.

When the brake 1 is applied and the control module 41 recognises a signal from the speed sensor 40 as a skid signal, the control module 41 energises the solenoid-operated valve 60 to close the valve and isolate the master cylinder 3 from the brake 1, and energises the solenoid-operated valve 11 to open the valve thereby connecting the passage 80 to the passage 78. The corresponding reduction in pressure on the downstream side of the restricted orifice 79 causes the diaphragm 75 to deflect away from the seating 76 so that fluid can be relieved rapidly from the brake 1 and to the reservoir 13 through the passages 73 and 77.

Energisation of the solenoid-operated valves 60 and 11 is accompanied by operation of the pump 14 which withdraws fluid from the reservoir 13 through the one-way valve 71, and pumps it back to the master cylinder 3 through the one-way valve 72.

When the wheel recovers, the control module 41 is operative to cause the solenoid-operated valve 11 to close, and the solenoid-operated valve 60 to open. Closure of the solenoid-operated valve 11 causes pressure to build up on the downstream side of the restricted orifice 79 which, in turn, urges the diaphragm 75 against the seating 76 to isolate the brake 1 from the reservoir 13 since that pressure is still being reduced by the pump 14. Opening the solenoid-operated valve 11 causes the brake 1 to be re-applied from the pump 14 and the master cylinder 3. The rate of brake re-application can be controlled by pulsing the solenoid-operated valve 60.

At any stage during a brake-applying sequence, the pressure applied to the brake 1 can be held by closing the solenoid-operated valve 11.

Figure 3:
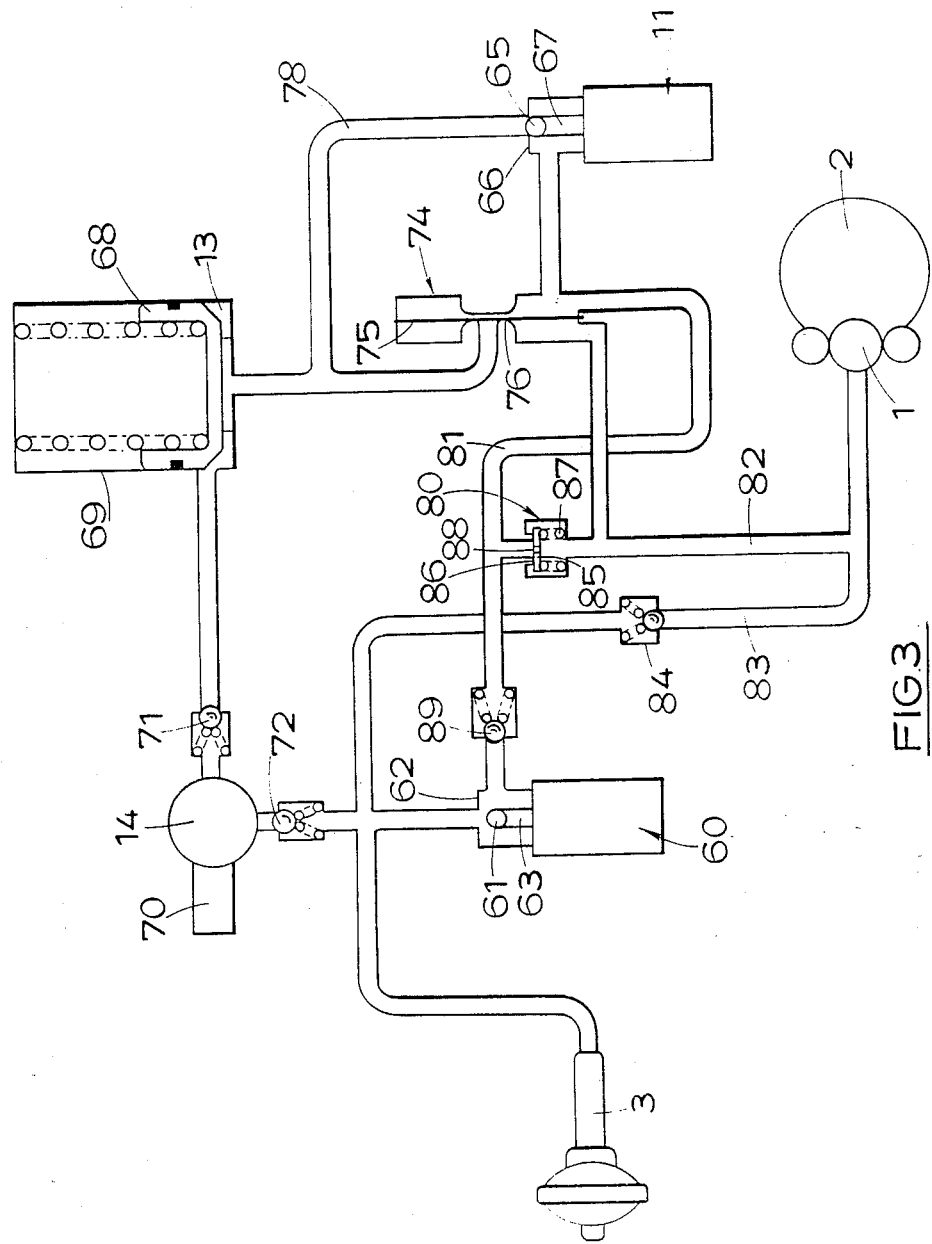
FIG. 3 is a layout of another hydraulic anti-lock braking system similar to FIG. 2 but including some modifications.

In the system illustrated in the layout of FIG. 3 the restricted orifice 79 is replaced by a combined by-pass and restrictor valve 80 through which the master cylinder 3 communicates with the brake 1, at least when the solenoid-operated valve 60 is open. The upstream side of the valve 80 is connected to the side of the diaphragm 75 adjacent to the solenoid-operated valve 11 through a passage 81, and the opposite side of the diaphragm 75 which co-operates with the seating is in communication with a passage 82 between the downstream side of the valve 80 and the brake 1. A return passage 83 from the brake 1 leads back to the master cylinder 3 through a one-way valve 84.

The by-pass and restrictor valve 80 comprises a valve member 85 which is normally urged into engagement with a seating 86 by means of a return spring 87, and a restricted orifice 88 in the valve member 85 permits a restricted flow through the valve 80 when the valve member 85 is in engagement with the seating 86.

A one-way valve 89 is located in the passage 81 between the solenoid-operated valve 60 and the intersection of the passage 81 with the passage 82 to prevent fluid from being returned to the master cylinder 3 from the brake 1 through the orifice 88 and from the pilot valve 74.

As in the system of FIG. 2, in an inoperative position the solenoid-operated valve 60 is open, the solenoid-operated valve 11 is closed, and the pump 14 is inoperative.

When the brake 1 is applied fluid from the master cylinder 3 is transmitted to it through the open valve 60 and through the by-pass and restrictor valve 80 which opens fully with the valve member 85 moving away from the seating 86 against the loading in the spring 87. This pressure is applied to both sides of the diaphragm 75 so that the valve 74 is held in its closed position.

When the master cylinder 3 is released, fluid from the brake is returned to it through the one-way valve 84. Due to the presence of the one-way valve 89, the orifice 88 acts to place the chambers on both sides of the diaphragm 75 in communication, thereby ensuring that a differential is maintained to hold the pilot valve 74 in a closed position. As in the system of FIG. 2, accidental opening of the pilot valve 74 could cause fluid to be trapped in an expander reservoir 13 to prevent the brake 1 from being released and/or re-applied satisfactorily.

When a skid signal is recognised by the control module the solenoid-operated valve 60 closes to isolate the master cylinder 3 from the brake 1, and the solenoid-operated valve 11 opens to relieve the pressure on the adjacent side of the diaphragm 75 to the reservoir 13. This causes an imbalance in the pilot valve 74 and the diaphragm 75 deflects away from the seating 76 to allow the pressure in the brake 1 to be dropped rapidly to the reservoir 13.

At the same time as the skid signal is recognised by the control module, the motor 70 is energised to operate the pump 14 as described above to withdraw fluid from the reservoir 13 and return it to the master cylinder 3 through the one-way valve 72.

When the wheel 2 has recovered, the valve 11 closes and the valve 60 opens. Higher pressure acts on the face of the diaphragm 75 adjacent to the valve 11 to cause it to re-engage with the seating 76. Thereafter the brake 1 is re-applied automatically from the pump 14 and the master cylinder 3, through the by-pass and restrictor valve 60, but at a rate determined by pulsing the solenoid-operated valve 60.

At any stage in a braking cycle the brake pressure, applied to the brake 1, can be held.

For example, on initial brake application by normal operation of the master cylinder 3, the valve 60 can be used to isolate the brake 1 from the master cylinder 3.

Again, during automatic cycling of the brake-applying pressure with the pump 14 operative, the inlet valve 60 is closed in addition to the outlet valve 11. The fluid being returned from the reservoir 13 by the pump is then returned solely to the master cylinder 3 and none of the output from the pump 14 can be returned to the brake 1 due to the presence of the one-way valve 84. When such a 'hold' phase is complete, the solenoid of the inlet valve 60 is pulsed to control the rate at which the pressure is re-applied to the brake 1.

The construction and operation of the system of FIG. 3 is otherwise the same as that of FIG. 2 and corresponding reference numerals have been applied to corresponding parts.

We claim:

1. An hydraulic anti-lock braking system for vehicles comprising a brake on a wheel, a reservoir for fluid, a master cylinder providing a supply of brake-applying fluid to apply said brake, anti-lock means for sensing the behaviour of said wheel and emitting anti-lock signals, brake-pressure modulating means for controlling said supply of brake-applying fluid to said brake in accordance with the behaviour of said braked wheel, a solenoid-operated control valve incorporated in said modulating means and responsive to an anti-lock signal to cause said brake to be released by relieving hydraulic fluid to said reservoir, and fluid pressure means to cause said brake to be re-applied automatically following recovery of said wheel, re-application of said brake being initiated by said solenoid-operated control valve, wherein said solenoid-operated control valve incorporates a normally-closed exhaust valve for controlling the release of hydraulic fluid to the reservoir, said exhaust valve comprising an exhaust port, and a valve member controlling flow through said port, a pilot valve is adapted to provide communication to said reservoir through an exhaust passage of a size greater than that of said exhaust port, and a pressure-responsive member is adapted to control operation of said pilot valve, said pilot valve normally being biased into a closed position to close said exhaust passage but being movable into an open position in response to a pressure drop across said pressure-responsive member, said pressure drop being established by said exhaust valve opening upon energisation of said solenoid.

2. A system as claimed in claim 1, wherein said pilot valve comprises a flexible diaphragm, a valve seating at an end of said exhaust passage remote from said reservoir and into engagement with which said diaphragm is biased to close said exhaust passage when substantially equal pressures are applied to opposite sides of said diaphragm, a servo chamber on a side of said diaphragm remote from said seating being placed in communication with said reservoir to establish the said pressure drop when said exhaust valve opens, restrictor means being provided for restricting the application of pressure to a side of said diaphragm opposite said servo chamber in comparison with relatively unrestricted re-application of pressure to said servo chamber upon closure of said exhaust valve, in turn to cause said pilot valve to close.

3. A system as claimed in claim 1, wherein said restrictor means comprises a restrictor in a line leading from said fluid-pressure means to said side of said diaphragm remote from said servo chamber.

4. A system as claimed in claim 1, wherein said restrictor comprises an orifice in a one-way valve which is adapted to open to provide communication to said brake.

5. A system as claimed in claim 1, wherein said restrictor means comprises an orifice leading to said servo chamber whereby a higher pressure is developed in said servo chamber upon closure of said exhaust valve.

6. A system as claimed in claim 1, wherein said diaphragm is biased towards said seating by the inherent resilience in the material of said diaphragm.

7. A system as claimed in claim 1, wherein said pilot valve is remote from said solenoid-operated control valve.

* * * * *